United States Patent [19]

Nourigeon

[11] 4,414,228
[45] Nov. 8, 1983

[54] PROCESS FOR PREPARING DEEP-FROZEN YEAST BREAD DOUGH

[75] Inventor: Andre Nourigeon, Istres, France

[73] Assignee: Grandes Boulangeries Associees G.B.A., Paris, France

[21] Appl. No.: 336,030

[22] Filed: Dec. 30, 1981

[30] Foreign Application Priority Data

Jan. 8, 1981 [FR] France ................. 8100215

[51] Int. Cl.³ .................. A21D 8/02; C12N 1/06
[52] U.S. Cl. .................. 426/19; 426/62; 435/260
[58] Field of Search .......... 426/19, 62; 435/260

[56] References Cited

U.S. PATENT DOCUMENTS 3,375,117  3/1968  Schremmer .............. 426/62
3,449,131  6/1969  Fritzberg ............... 426/453

OTHER PUBLICATIONS

The Bakers Digest, vol. 48, No. 2, 4/74 pp. 14, 15, 18, 19, 21.
The Bakers Digest, vol. 42, No. 5, 10/68, pp. 44-46, 48-50.
The Bakers Digest, vol. 52, No. 5, 10/78, pp. 18-20, 37.

*Primary Examiner*—Raymond N. Jones
*Assistant Examiner*—Elizabeth A. Hatcher
*Attorney, Agent, or Firm*—Shenier & O'Connor

[57] ABSTRACT

The present invention relates to a process for preparing bread dough which may be deep-frozen with a view to long conservation thereof, characterized in that the yeast used was previously subjected to a stabilization by deep-freezing and that the mixing and kneading operations are carried out in a minimum of time without the dough attaining the temperature of 20° C., after which the dough obtained is rapidly cooled until its innermost temperature attains at least −7° C. The present invention also relates to a process for biological de-freezing of deep-frozen bread dough.

3 Claims, No Drawings

PROCESS FOR PREPARING DEEP-FROZEN YEAST BREAD DOUGH

The present invention relates to a process for preparing deep-frozen bread dough capable of being kept for a long time; it also relates to a process for rapidly defreezing previously deep-frozen bread dough, under fermentable conditions.

The technical sector concerned is that of bread-making and more particularly the preparation of bread dough before and after conservation.

Cold-storage has been the subject matter of much research, particularly in the domain of food. As far as bread is concerned, it is known how to keep it once baked. However, before being baked, numerous problems are raised for its conservation, due to the fermentation of the dough which cannot be controlled once the reaction has started. The cold does not inhibit the latter, unless the tissues are blocked before the reaction starts. To this end, a process has been proposed in which the different components of the dough, apart from the flour, namely yeast, salt, malt, are frozen, at $-10°$, $-5°$ C., preferably, and a mixing is carried out without incorporation of yeast in the mix, said yeast being introduced only during kneading. The latter is then divided into three stages: 5 mins. without yeast, 7-20 mins. with yeast, 2-3 mins. with salt. Finally, deep-freezing, preferably to $-40°$ C. is effected, without ventilation. When the dough is used, with a view to fermentation, the temperature of the lumps of dough is progressively raised, firstly at least 12 hours at $-10°$ C., then to fermentation temperature.

However, this process presents certain drawbacks:
the effect of the freezing of the salt and malt is to increase the porosity of the dough at final baking;
the process is long due to the necessity of adding the yeast only at the kneading stage;
finally, the process involves a slow de-freezing, which increases the time necessary for using the deep-frozen lumps of dough and risks causing a certain degradation of the dough.

It is an object of the present invention to overcome these various drawbacks.

Firstly, it has been found that a good-quality deep-frozen bread dough may advantageously be obtained by using a yeast "stabilised by deep-freezing".

It has been demonstrated that, when a biological yeast—such as the yeast normally used for preparing bread—was subjected to low temperatures (lower than about $-15°$ C.) for increasing periods of time, certain components of these yeasts progressively lost their fermentable power (measured at ambient temperature), whereas the other components of these yeasts conserved or even improved their fermentable power.

According to the present invention, the biological yeasts are suitably subjected to sufficiently low temperatures for a sufficient period of time to cause the destruction, in said yeasts, of all the components capable of being killed by these low temperatures.

As with the majority of known yeasts, "the stabilisation by deep-freezing" of said yeasts necessitates:
about 48 hours at a temperature of about $-15°$ C.
about 24 hours at a temperature of about $-20°$ C.
about 20 minutes at a temperature of about $-190°$ C.

In practice, the use of too low temperatures (less than about $-80°$ C.) is difficult to imagine, and it is recommended to obtain the yeasts "stabilised by deep-freezing" by placing the packets of yeast in an atmosphere of which the temperature is between $-15°$ and 40° C. for a period of at least 24 hours.

As the yeast "stabilised by deep-freezing" is very hard when it is at low temperature (for example $-20°$ C.) and virtually non-miscible with the other ingredients of the bread, it must be returned to ambient temperature before it is used. However, it is important to ensure that the mean temperature of the reheated packet of yeast does not exceed about 15° C.; the highest temperature of said packet of yeast must in no case exceed 20° C.

The stabilised yeast having been "reheated" as described hereinabove, the bread is prepared in conventional manner by carrying out the mixing then kneading operations.

However, the following features will be noted when the dough is being prepared:

(a) the quantities of yeast to be used are greater than the quantities of yeast which it is usually recommended to use; this is normal, since part of the yeast has lost its activity when it is deep-frozen; it is generally accepted that the quantities of yeast to be used are at least twice the quantities normally used (for example 50 to 70 g of deep-frozen yeast per kg of flour).

(b) sufficient quantities of gluten and malt must be found in the components of the dough. This is why the following will advantageously be added to the ingredients constituting the dough:
from 0.5 to 1 per thousand by weight with respect to the flour, of gluten
from 0.5 to 2% by weight with respect to the flour, of malt; the purpose of the malt is to increase the diastasic activity of the dough during subsequent fermentation.

(c) in the process, the mixing and kneading operations must be carried out in a minimum period of time (from 15 to 20 mins. for kneading) and under conditions such that the temperature of the dough does not exceed a temperature of about 20° C. The flour used in the process of the present invention may be any bread-making flour without correction of the glutinous tissue; however, it is also possible to use flour of very low bread-making value (of which the diastasic activity is very weak or zero) which would be considered as unusable for preparing bread according to known techniques.

When the dough has been obtained, it is divided into balls (or cylinders) to make lumps of the desired shape. These lumps of dough are then subjected to deep-freezing.

This deep-freezing consists in placing the lumps of dough under such conditions that their innermost temperature is brought as quickly as possible to a temperature less than $-7°$ C. This deep-freezing may for example be effected by placing the lumps of dough in cold air of which the temperature is maintained between $-50°$ and $-20°$ C. As soon as this (innermost) temperature of $-7°$ C. has been obtained, the lumps of dough may be packed either separately or in packets.

This packaging consists in enclosing the lumps of dough in a film of plastics material (or a complex film), preferably opaque, having a very high impermeability with respect to water vapour. In fact, the "water-content" of these lumps which, when they are prepared, is at about 35% by weight, should remain in the vicinity of this value.

Due to a long period of conservation of the lumps of dough at low temperature (for example $-20°$ C.) and to the use of a packing film which is too permeable to water vapour, it is possilbe that the lumps of dough undergo a phenomenon of dehydration (similar to the well known phenomenon of lyophilisation). In this case, this phenomenon may be remedied in two ways: either the impermeability of the packing film to water vapour is increased, or the lumps of dough are coated with a layer of ice. The latter technique is especially advantageous, in the present state of knowledge, when the lumps of dough have to be conserved for a period at least equal to about six months.

The various stages of the process according to the invention are therefore as follows:

I—In a first stage, the yeast is deep-frozen prior to making the dough. Of course, on an industrial scale, this stage will not be carried out each time batches of bread are made. Rather than freeze a small quantity of yeast each time, freezing will be provided for a large number of identical operations. In practice, this stage will be carried out upon supply. After the yeast has been delivered, it is placed in the freezer, at such a temperature that the yeast rapidly attains about $-18°$ C. It must be maintained at this temperature for at least 24 hrs.

About 24 hours before the preparation of the dough, said yeast is then to reheat slowly up to a temperature of about 10° C.

II—In a second stage, mixing is effected, viz. an intimate mixture at average speed of all the components of the bread dough, except the salt. Generally, flour, or flour and gluten, water, yeast, malt and possibly other additives are used.

The preferred speed is 30 revs./min. and the duration of mixing is about 5 mins.

The quantity of gluten is added to a flour of low bread-making value in a percent of 0.5 to 1, the gluten being of a degree of purity equal to 90%.

III—In a third stage, the mixture obtained previously is kneaded for between about 15 and 20 mins., at a speed greater than that of mixing, preferably at 60 revs./min. The ambient temperature and the quality of the flour used cause the duration of kneading to vary in inverse function. Thus, in summer, the mixture will be kneaded for a shorter period than in winter. If a flour of low bread-making value is used, kneading will be stopped earlier.

At the end of kneading, the necessary quantity of salt is incorporated at the same speed, preferably at 60 revs./min, for a period of between 2 and 7 mins. As before, this period is an inverse function of the ambient temperature and the quality of the flour used.

A variant of this stage is intended for carrying out the process in hot countries. As the aim is to conserve a dough which has not yet reached the fermentation stage, care must be taken that operation is not carried out at too high temperatures which are detrimental: the dough must not exceed 20° C. at its heart. An intermediate stage is introduced in the course of kneading and before the salt is incorporated. The necessary quantity of salt is moistened in running water. This water is that traditionally used in bread-making during preparation of the dough for cooling same.

Another variant provides adding ice in the course of kneading to avoid a rise in temperature of the dough.

The subsequent steps of weighing and shaping are conventional and non-inventive, known to the man skilled in the art.

The lumps of dough are then taken directly into cold storage chambers to refrigerate them to a temperature of at least $-7°$ C. (at the heart of the lump of dough). It is during this operation that, by operating in an atmosphere oversaturated with water vapour, the lumps of dough may be coated with a layer of ice which, as has been explained hereinabove, will be very useful for keeping these lumps of dough for periods at least equal to about six months.

The lumps of dough are then packed in packings, preferably opaque, impermeable to water vapour. If, for any reason, despite the precautions taken, it may be thought that a certain fermentation has begun to develop in the lumps of dough (appearance of $CO_2$), it may be expedient, to improve conservation of the dough, to scavenge the atmosphere which develops in the packing either by making a vacuum or by scavenging with an inert gas (nitrogen).

Once the lump of dough has been adequately packed, it is conserved and stored in conventional chambers maintaining a temperature preferably included between $-15°$ C. and $-18°$ C. Delivery will be carried out under conditions complying with the regulations in force.

The present invention also relates to a process for de-freezing the lumps of dough; this process may be used in particular when the lumps of dough have been prepared according to the process described hereinabove, but it may also be used for any lump of dough conserved in the deep-frozen state (for example towards $-20°$ C.) and containing biological yeasts.

The biological de-freezing according to the invention is characterised in that the lumps of dough, taken out of the storage chamber and their packing, are subjected to a temperature of about 90° C. to 100° C. in a water vapour saturated atmosphere for a period of 3 to 7 minutes, preferably about 5 minutes, since the hot, humid gaseous atmosphere surrounding the lumps of dough is replaced by air at a temperature of between 20° and 30° C., this atmosphere being maintained until the temperature of the lump of dough reaches about 20° C. at its heart.

Fermentation started under these conditions continues in known manner until the state of the fermented (and risen) dough appears to the specialist as being suitable.

This biological de-freezing has the advantage, on the one hand, of a considerable rapidity and on the other hand of a considerable regularity of fermentation in the whole mass of the bread.

The following non-limiting example illustrates the two aspects of the present invention.

EXAMPLE

To prepare about 100 kg of dough, the main ingredients have been taken in the following approximate proportions:

| | |
|---|---|
| flour of low bread-making value | 100 kg |
| water | 60 kg |
| gluten (90% pure) | 750 g |
| malt | 1.6 kg |
| salt | 20 g |
| yeast | 7.5 kg |

The packets of yeast used for preparing this dough had undergone the following treatments:

they had been placed in an atmosphere of which the temperature was maintained at $-40°$ C. for a period of 48 hours, they had then been taken out of the cold-storage chamber and left at ambient temperature (15° C.) for about 12 hours.

The various ingredients were mixed at 30 revs./min.$^{-1}$ for 5 mins., kneading at 60 revs./min.$^{-1}$ for 15 mins., then 2 mins. after the salt has been incorporated. Weighing and shaping are then effected in conventional manner to make lumps of dough each weighing about 300 g. They are then dipped in cool water and taken to the temperature of −20° C. for 25 mins., with ventilation of cold air. The end of the operation is detected by the outside appearance of the lump of dough forming a compact block. The lumps of dough are placed in cold-storage chambers at about −18° C.

The lumps of dough were then packed, in 100's, in a film of polyethylene.

The lumps of dough may thus be conserved for more than six months at −20° C., maintaining all their properties.

The lumps of dough removed from their packing are introduced into an oven regulated at 100° C. and containing a water vapour saturated atmosphere.

After five minutes, the lumps of dough are taken out of this oven and introduced for about 20 minutes in an oven of which the atmosphere is maintained at 25° C. After this period, it is checked that the temperature at the heart of the lump of dough is then 19° C.

The lumps of dough thus de-frozen are subjected to fermentation under known conditions; It has been observed that this period of fermentation could be from 20 to 40 minutes depending on the ambient temperature. The lumps of dough are then baked.

Various modifications may of course be made by the man skilled in the art to the process which has just been described by way of non-limiting example, without departing from the scope of the invention.

What is claimed is:

1. Process for preparing deep frozen yeast bread dough comprising the steps of:
    (A) deep-freezing yeast at a temperature lower than −15° C. for a sufficient period of time to stabilize the yeast;
    (B) incorporating the deep frozen yeast into a dough containing flour, gluten, and malt, wherein said gluten is present in 0.5 to 1% of flour and said malt is present in 0.5 to 2% by weight of flour;
    (C) mixing and kneading the dough under conditions whereby the dough does not exceed a temperature of 20° C.;
    (D) cooling said dough to a temperature of at least −70° C. at the heart of said dough.

2. The process of claim 1, wherein the flour used is a flour comprising a non-bread making flour.

3. The process of one of claims 1 and 2, wherein the cooled dough is coated with a layer of ice.

* * * * *

UNITED STATES PATENT AND TRADEMARK OFFICE
CERTIFICATE OF CORRECTION

PATENT NO.   :   4,414,228
DATED        :   November 8, 1983
INVENTOR(S)  :   Andre Nourigeon It is certified that error appears in the above-identified patent and that said Letters Patent are hereby corrected as shown below:

Column 6, line 24  -   "-70°" should be "-7°"

Signed and Sealed this

Thirtieth Day of April 1985

[SEAL]

Attest:

DONALD J. QUIGG

*Attesting Officer*    *Acting Commissioner of Patents and Trademarks*